INVENTORS
ALBERT A. MINCIOTTI
RICHARD GRAU
BY
Barnes, Kisselle, Raisch & Choate
ATTORNEYS

United States Patent Office 3,439,787
Patented Apr. 22, 1969

---

3,439,787
DOUBLE MAGNETIC-FLUID CLUTCH SYSTEM FOR SERVOCONTROL MECHANISM
Albert A. Minciotti and Richard Grau, Grand Rapids, Mich., assignors to Conductron Corporation, Ann Arbor, Mich., a corporation of Delaware
Filed May 5, 1967, Ser. No. 636,404
Int. Cl. F16d 27/00, 29/00, 11/06
U.S. Cl. 192—21.5      3 Claims

---

ABSTRACT OF THE DISCLOSURE

The use, in a reversible servocontrol mechanism, of a pair of electromagnetic particle clutches each adjustable by a relative motion of electromagnetic field and rotors to obtain a constant torque gain to permit accurate matching of the output of the clutches, and the specific clutch design utilizing an axially movable electromagnetic field to obtain such adjustment.

---

This invention relates to a servocontrol mechanism and more particularly to a clutch arrangement which can be utilized to operate a servo output with accuracy in one direction or the other.

In servomechanisms, generally where clutches are used to cut in power from a prime mover which is operating in a single direction, it is difficult to obtain a matched output so that the servo can be properly calibrated and balanced for operation in each direction.

It is an object of the present invention to provide a clutch mechanism which permits a ready adjustment of respective clutches in a drive circuit and yet one which permits broader tolerances in manufacturing. In addition, it is possible to eliminate in an electromagnetic clutch system a clutch current adjustment which compensates for variation of clutch resistance.

It is, therefore, an object of the present invention to provide a servosystem with a balanced clutch condition and more particularly a magentic particle clutch which has an adjustable torque current gain.

A further object of the invention is the provision of a magnetic particle clutch of the type above referred to which is so designed that the adjustment can be made from the outside of the housing in a simple manner to permit easy balancing of similar clutches without dismantling the clutch and to obtain dynamic balancing of clutch output while the device is operating.

A further object is the provision of an adjustable clutch construction which is independent of any wear of the parts so that a single adjustment for a certain torque can remain for a long period of use.

Other objects and features of the invention will be apparent in the following description and claims in which the principles of the invention and the operation are set forth together with the best mode contemplated for carrying out the invention.

Figure 1:
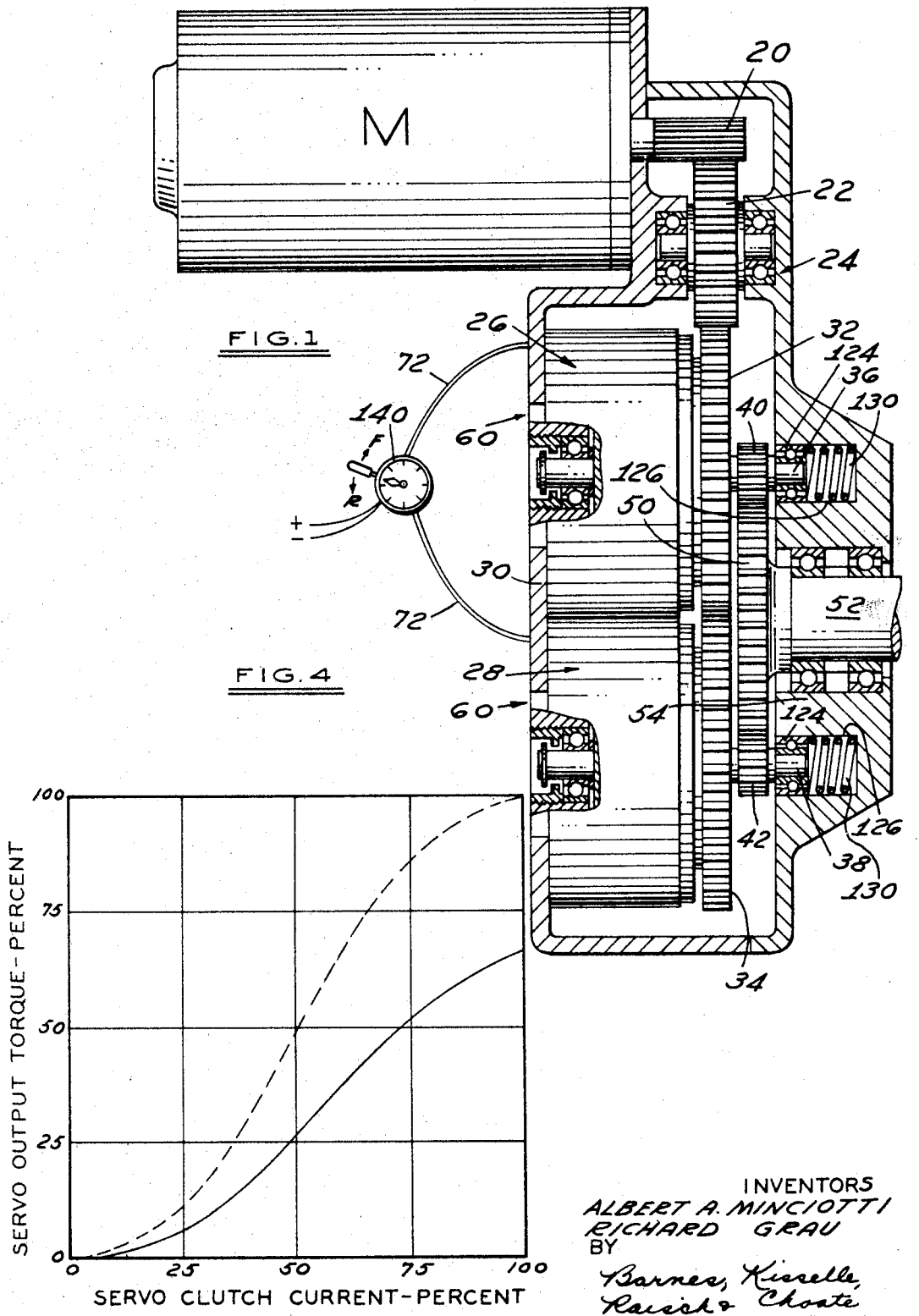

Drawings accompany the disclosure and the various views thereof may be briefly described as:

FIGURE 1, a sectional view illustrating the invention in connection with a servo drive.

Figure 2:
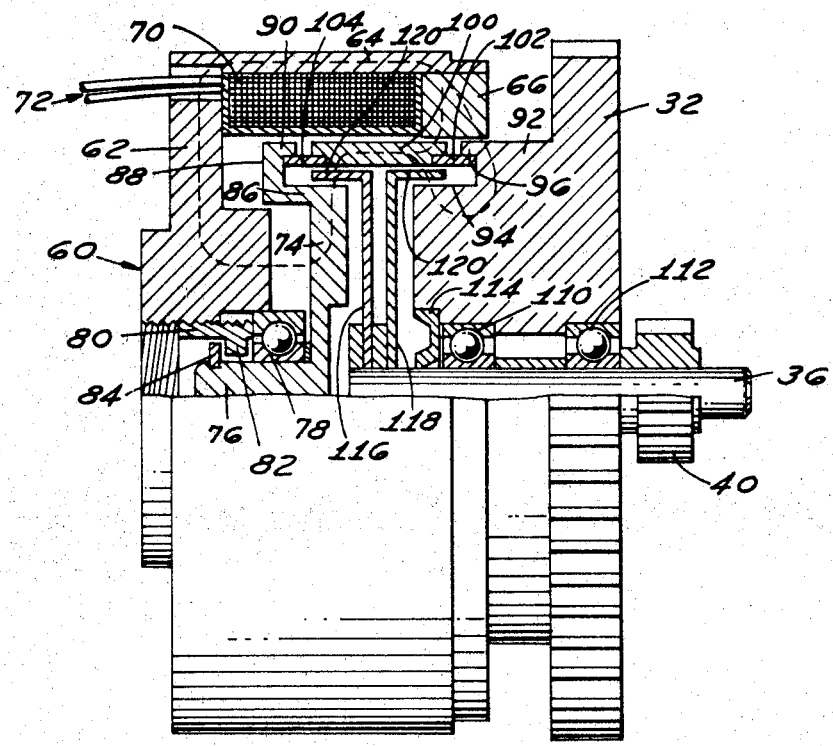

FIGURE 2, a view partially in section showing one of the clutching mechanisms.

Figure 3:
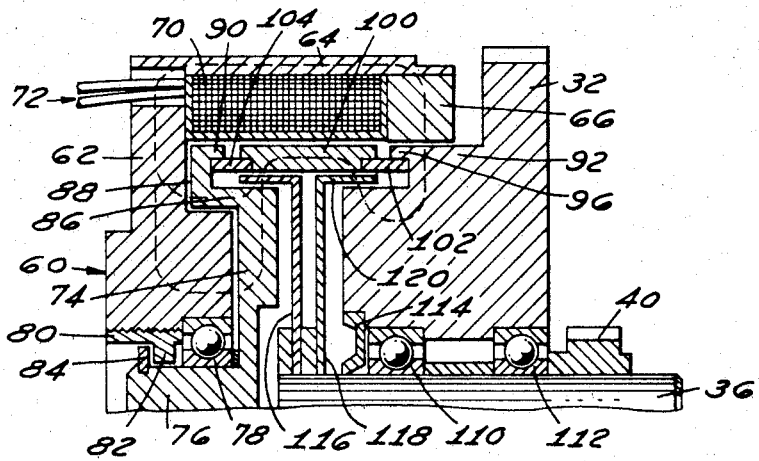

FIGURE 3, a view similar to FIGURE 2 showing the parts in different relative position.

FIGURE 4, a graph showing an example of the servo output torque percent in relation to servo clutch current percent.

Referring to FIGURE 1, a drive motor M has a gear shaft 20 which drives an idler gear 22 suitably mounted in a clutch housing 24 on which the motor is mounted. A pair of clutches 26 and 28 are mounted on one wall 30 of the housing 24, each clutch having an input gear 32 and 34 in driving engagement with each other, the gear 32 being engaged with the gear 22. Each clutch has an output shaft 36 and 38 carrying respectively gears 40 and 42 each of which engages a larger gear 50 mounted on a drive shaft 52 in suitable bearings in a hub 54 on the front face of the housing 24. It will be noted that gear 22 is wider in axial dimension than gear 32 to maintain engagement in a range of relatively axial movement of the two as later described.

Referring to FIGURE 2 where the details of the clutch construction are shown, it will be seen that each clutch 26 and 28 is composed of a main steel housing 60 comprising a back plate 62 having an axially extending flange 64 mounted directly inside of the flange 64 and between the back plate 62 and a locating flux ring 66 is an annular electromagnetic winding 70 which receives current through wires 72. The clutch input is composed of a rotor 74 consisting of an outwardly extending disc portion having a hub 76 which is mounted in a suitable bearing 78 in a central opening in the housing 60.

A threaded ring 80 in the opening of housing 60 has an inwardly directed annular ridge 82 which is located between the bearing assembly 78 and a snap ring 84 so that the axial position of the rotor 74 relative to the housing 60 is determined by the position of the ring 80. The disc portion of the rotor 74 has a return flange 86 which continues radially in a portion 88 and axially in a short return rim 90.

Gear 32, formed preferably of steel, has a large hub portion 92 passing through flux ring 66 with slight clearance and which is reduced at 94 and is provided with a short rim portion 96 which corresponds radially and axially to the portion 90 on rotor 74. Bridging the disc 74 and the hub 92 on the clutch input gear is a ring 100 of magnetic flux material, this ring being relatively thin and extending most of the distance between the flange portions 90 and 96. This ring is provided with inner annular recesses on each edge which cooperate with supporting and locating rings 102 and 104. A quantity of magnetic particles is retained by this input rotor assembly.

Thus, the rotor 74 and the gear 32 will rotate as a unit by reason of the bridging rings 102 and 104, and it will be noted that the ring 100 is fairly close to the winding 70. The hub portion of the gear 32 supports, in a central bore, two bearing assemblies 110 and 112 in which is mounted the shaft 36 carrying the gear 40. Directly inside of the bearing assembly 110 is a suitable seal 114 for magnetic material which can be of any standard composition. The seal 114 is preferably centrifugally controlled so that it releases pressure on the shaft 36 as the parts reach a certain speed of rotation. On the inner end of shaft 36 is a clutch output rotor composed of two disc plates 116 and 118 each having oppositely directed flanges 120 which lie radially just inside of the magnetic ring 100. The material from which the rotors 116 and 118 are formed is also preferably of a magnetic composition and the rotors are suitably locked on the shaft 36.

In FIGURE 1, it will be noted that the outer end of shaft 36 is mounted in a bearing element 124, this bearing construction being slidable in recess 126 against a spring 130. The same construction is provided for the shaft 38 in the clutch 28.

It will be seen from the above that the clutch housing 60 for clutches 26 and 28 is mounted in a stationary position on the wall 30 with a central circular portion recessing into a hole in the wall. However, it is possible to shift the rotor assemblies relative to the stationary portion of the housing because of the adjustable ring 80 which controls the position of rotor 76 as well as the position of the gear 32. Movement of the input gear assembly of the clutch will also shift the output rotor by reason of the frictional engagement of the gear 40 with the bearing assembly 112 and also by reason of the axially movable spring resisted bearing mount 124. As illustrated in FIGURES 2 and 3, therefore, the entire rotor assembly may be shifted axially relative to the housing 60 and in this movement gear 32 will slide axially relative to the gear 22 and gears 40 and 42 will slide relative to output gear 50.

In FIGURE 2, the rotor assembly is shifted to what may be assumed to be an extreme position to the right relative to the winding 70. In FIGURE 3, the rotor assembly under the control of ring 80 and springs 130 is shown moved to an extreme position to the left wherein the entire rotor assembly is fully within the field and which will be created by the electromagnetic winding. The field path is represented diagrammatically in the two figures in dotted lines. The effect of the field on the magnetic parts and the magentic particle mass in the clutch will be much stronger in the position shown in FIGURE 3 than in that shown in FIGURE 2.

In FIGURE 4, there is shown a representation of the output torque relative to clutch current from the different positions. For example, the dotted line in FIGURE 4 shows the percentage output torque when the parts are moved to the position shown in FIGURE 3, and the solid line shows the output torque when the parts are moved to the position shown in FIGURE 2. A suitable spanner wrench mechanism can be utilized to actuate the threaded ring 80.

Assuming, for example, that the power source M is a constant speed motor, although it need not be, and is operating at a certain speed, the gear 20 will drive the gear 22 and this in turn will rotate engaged gears 32 and 34 at a particular speed. In the absence of current to the electromagnetic windings of the respective clutches, there will be no movement of the output shafts 36 and 38 and, accordingly, no movement of the common output servo control shaft 52. However, when current is directed to the electromagnetic winding of a particular clutch through a variable control 140, the magnetic particles of that clutch will be attacted through the magnetic field and in a manner common to magnetic particles clutches, the output rotor will almost instantly pick up the speed of the input rotor and the parts will be locked together in rotation. The control mechanism 140 can, accordingly, be actuated in a forward or reverse direction and this actuation will find response in the output shaft 52. If the clutch 26 is energized, this will rotate the gear 40 and transmit power to the gear 50 and the shaft 52 in one direction while the rotor portions of clutch 28 are free to rotate relative to each other. If the actuation is reversed, clutch 28 will pick up the load and the output shaft 52 will rotate in the other direction.

One great advantage of this type of control is that in a servo mechanism, the parts can be adjusted for torque when the servo is in a dynamic condition, that is, both clockwise and counterclockwise clutches are rotating. Thus, there can be compensation for the dynamic torque of the clutch which can be perfectly balanced and also for the gear train efficiencies which may differ in clockwise and counterclockwise direction. The system can also be corrected for dimensional tolerances which affect performance, making it possible to reduce manufacturing tolerances and still have an output which is fully under control and well balanced. This system also avoids the necessity of an adjustable potentiometer in series with each clutch in order to compensate for variations in resistance. The clutches, of course, constructed according to the present invention can also be used individually where it is desirable to have an adjustable torque gain.

What is claimed as new is as follows:

1. A magnetic clutch for use in a drive mechanism such as a servocontrol mechanism and the like which comprises:
    (a) a dish-shaped primary housing having a first central opening and an outer axially extending flange,
    (b) a first bearing means in said opening,
    (c) a secondary housing having a portion mounted for rotation on said bearing means and a flanged portion to rotate in radial proximity to said axially extending flange, said secondary housing having means forming a radial chamber inside said flanged portion terminating in a second central opening,
    (d) means to drive said secondary housing as an input member,
    (e) a bearing means in said second central opening,
    (f) a rotating output member mounted in said last named bearing means having a portion extending into said radial chamber to position adjacent said flange and said flanged portion and rotatable independently of said secondary housing,
    (g) a quantity of magnetic particles in said chamber,
    (h) means on one of said housings for creating an electromagnetic field adjacent said radial chamber and for transmitting said field to said particles to create a clutching action between said secondary housing and said rotating output member, and
    (i) means for mounting said first bearing means for relative axial movement with said primary housing wherein said primary and secondary housings may be moved axially relative to each other to vary the electromagnetic force in said radial chamber thereby permitting adjustment of the torque developed between said secondary housing and said output member.

2. A magnetic particle clutch for use in a drive mechanism such as a servo control mechanism and the like which comprises:
    (a) a housing having an annular recess,
    (b) an annular electromagnetic winding in said recess,
    (c) a pair of rotors to be located in said housing for relative rotation relative to each other and to said housing having portions rotating in potential field area of said winding when energized,
    (d) means for mounting said rotors and said winding for relative motion wherein said rotors may be located at varying field density positions of said winding to control the torque on said rotors for any particular field density,
        said housing comprising a body having a central opening concentric with said annular recess, and said means for mounting said rotors comprising:
    (e) an axially adjustable bearing assembly in said central opening,
    (f) a hub on one of said rotors mounted in said bearing assembly and movable axially with said bearing assembly,
    (g) a drive gear associated with said one rotor and forming therewith a compartment to retain a quantity of magnetic particles, said drive gear having a central opening,
(h) a bearing assembly in said central opening of said drive gear, and
(i) a shaft mounted for rotation in said bearing assembly of said drive gear serving as a mount for the other of said rotors.

3. A magnetic particle clutch for use in a drive mechanism as defined in claim 2 in which said clutch mechanism is mounted in a support body, said housing being stationary relative to said support body, and said shaft mounted for rotation in said bearing assembly of said drive gear has one portion slidably mounted in said support body, a bearing supporting said one portion slidable in said support body, and resilient means exerting an inward endwise pressure on said shaft.

References Cited

UNITED STATES PATENTS

| | | | |
|---|---|---|---|
| 2,872,002 | 2/1959 | Blaum | 192—21.5 |
| 3,001,619 | 9/1961 | Imperi | 192—21.5 |
| 3,327,802 | 6/1967 | Peras | 310—191 X |

OTHER REFERENCES

Parziale and Tilton: "Characteristics of Some Magnetic-Fluid Clutch Servomechanisms," Dec. 6, 1949, AIEE Technical Paper, 50–24.

BENJAMIN W. WYCHE III, *Primary Examiner.*

U.S. Cl. X.R.

74—361; 335—237